United States Patent [19]

Hanks

[11] Patent Number: 4,460,079
[45] Date of Patent: Jul. 17, 1984

[54] MODULAR UNIT FOR USE WITH A FLUID ENGAGED SPRING RELEASED AND A SPRING ENGAGED FLUID RELEASED FAN CLUTCH

[75] Inventor: James V. Hanks, Minneapolis, Minn.

[73] Assignee: Horton Industries, Inc., Minneapolis, Minn.

[21] Appl. No.: 271,631

[22] Filed: Jun. 8, 1981

[51] Int. Cl.³ .................... F16D 13/44; F16D 25/063
[52] U.S. Cl. ............................. 192/85 A; 192/91 A; 192/DIG. 1
[58] Field of Search ............ 192/85 A, 85 AA, 91 A, 192/DIG. 1; 188/368, 170

[56] References Cited

U.S. PATENT DOCUMENTS

| | | | |
|---|---|---|---|
| 2,661,148 | 12/1953 | Englander | 230/271 |
| 2,741,353 | 4/1956 | Ward | 192/85 AA |
| 2,806,568 | 9/1957 | Buss | 192/85 AA X |
| 2,983,124 | 5/1961 | Spase | 192/82 T |
| 3,011,607 | 12/1961 | Englander | 192/91 A X |
| 3,036,681 | 5/1962 | Crosby | 192/85 AA |
| 3,145,816 | 8/1964 | De Lorean et al. | 192/91 A |
| 3,253,687 | 5/1966 | Young | 192/85 |
| 3,396,909 | 8/1968 | Seifert | 192/82 T |
| 3,446,430 | 5/1969 | Elmer | 230/271 |
| 3,500,970 | 3/1970 | Schilling | 188/170 |
| 3,762,517 | 10/1973 | Hanks | 192/85 AB |
| 3,887,051 | 6/1975 | Bignell | 192/85 AA |
| 3,985,214 | 10/1976 | Hall et al. | 192/91 A |
| 4,238,017 | 12/1980 | Spokas | 192/91 A X |
| 4,355,710 | 10/1982 | Schilling | 192/85 A X |
| 4,425,993 | 1/1984 | Schilling | 192/85 A |

FOREIGN PATENT DOCUMENTS

| | | |
|---|---|---|
| 229910 | 10/1959 | Australia . |
| 230716 | 10/1959 | Australia . |
| 2815474 | 10/1979 | Fed. Rep. of Germany . |
| 907936 | 10/1962 | United Kingdom . |
| 2018369 | 10/1979 | United Kingdom . |

Primary Examiner—Rodney H. Bonck
Attorney, Agent, or Firm—Wicks & Nemer

[57] ABSTRACT

A modular unit for use with a fluid engaged spring released and a spring engaged fluid released fan clutch including an outer hollow hub which terminates in a radially extending annular friction flange with an annular flange connected to the outer hollow hub for connection with a live shaft. Also provided is an inner central hub mounted internally of said outer hub by means of a pair of bearings. The inner central hub terminates in an enlarged central portion which in turn terminates in a radially disposed circular wall portion terminating in a series of right angular flanges. An annular piston is provided which is slideably mounted on the enlarged central portion of the inner hub. A ring is provided having a series of fan blades extending therefrom and connected to the circular wall. The piston has a friction facing carried thereby. A rotary air union is carried by the circular wall with the enlarged central portion of the inner hub having a conduit leading from the air union to one side of the piston for causing the piston to move axially on the hub. Spring means is carried by the unit for urging the piston axially on the inner central hub.

19 Claims, 11 Drawing Figures 4,460,079

MODULAR UNIT FOR USE WITH A FLUID ENGAGED SPRING RELEASED AND A SPRING ENGAGED FLUID RELEASED FAN CLUTCH

SUMMARY

The invention relates to an improvement in clutches, and more particularly to clutches used in fan cooling of an engine.

It is an object of the invention to provide a modular unit for use with either a fluid engaged and spring released or a spring engaged and fluid released clutch.

It is a further object of the invention to provide a clutch with sufficient axial compactness to fit within the constraints of conventional engine fan cooling systems while at the same time providing a two-bearing support for maintaining axial rigidity even during disengagement. Known prior art with similar axial compactness provides only single bearing support depending upon friction facing clamping forces to produce axial rigidity. Since such friction facing clamping forces are present only during clamping engagement use of the clutch, undesirable lateral movement of the fan occurred when the clutch is in non-clamping disengagement. Such movement produces excess bearing load with ultimate premature bearing failure.

It is also an object of the invention to provide a unit having a construction which allows a single axially placed coil spring for positive separation of the clutching surfaces in a fluid engaged and spring released clutch.

It is a still further object of the invention to provide a unit having a construction which allows service accessibility to bearings and while at the same time having structural integrity without the need of costly and intricate splines. Additionally, to provide torque required with a single faced clutch, it is necessary for the diameter of the friction flange to be greater than the diameter of appropriate ball bearings. Likewise, the diameter of anticipated mounting flanges presented to such a clutch also exceed the bearing diameter. Moreover, since the mounting flange is also likely to be "live" for the purpose of transmitting power to the clutch friction flange, prior art provided for a splined hub passing through the inner race of the support bearing to accomplish the purpose of rotationally connecting the live mounting flange to the friction flange. Additionally, the spline as called for in the prior art is accompanied by a threaded connecting bolt for the purpose of separating the mounting flange from the friction flange when access to the bearing was required.

By directing power from the mounting flange to the outside race of the bearings the present invention accomplishes rotatable connection between the mounting flange and the friction flange and also provides service accessability to the bearings without a spline and connecting bolt.

Further, the construction disclosed allows the mounting of the fan blades on a ring conveniently separable from the unit by means of cap screws from the housing portion of the clutch. The ring not only forms a mount for the fan blades, but it forms a part of the housing. With the ring being separable from the unit, different sized fan blades can be quickly accommodated without extensive disassembly of the clutch proper.

In the drawings forming part of this application:

Figure 1:
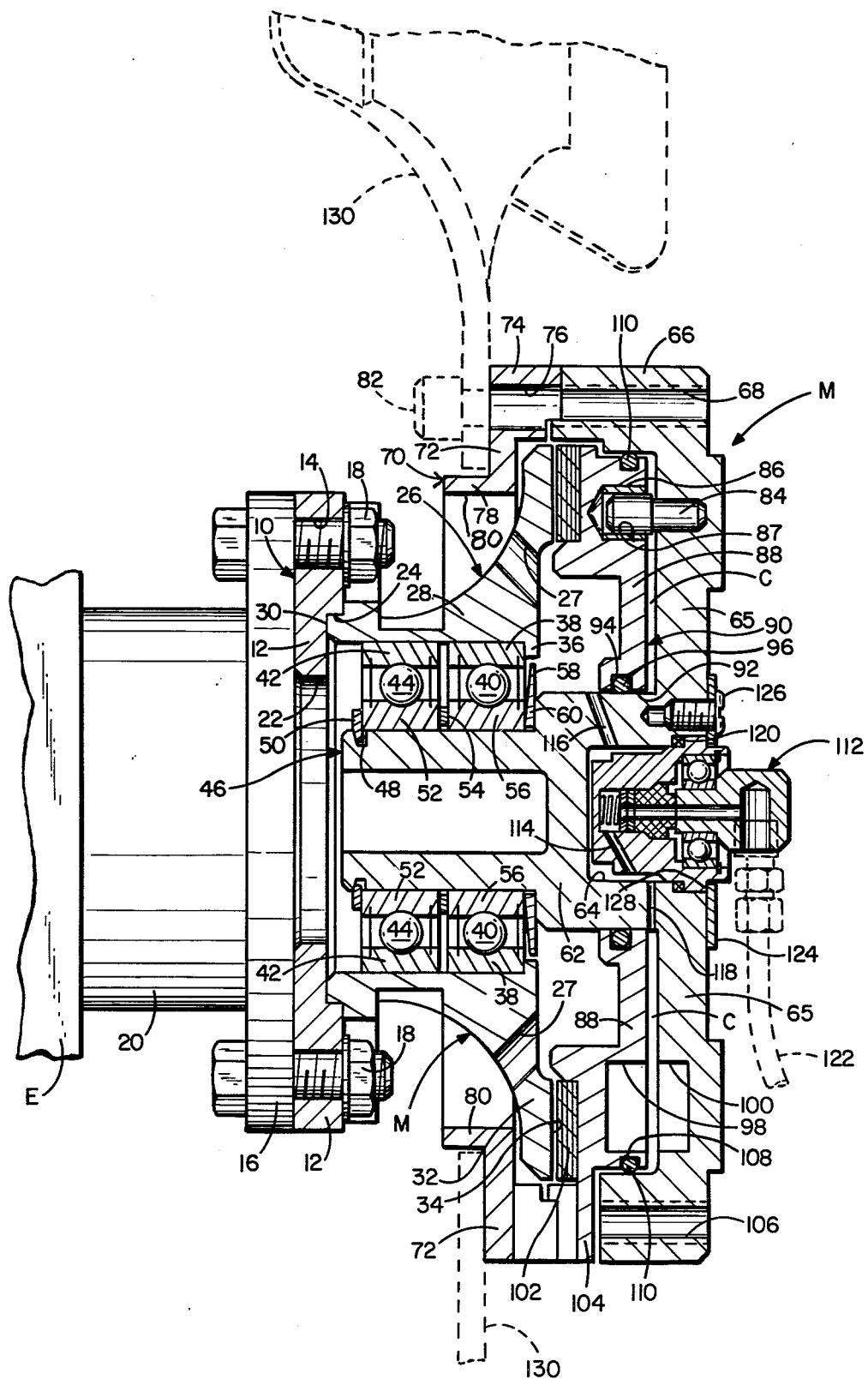
FIG. 1 is a sectional view of a modular mount for use with a fluid engaged and spring-released fan clutch or with a spring-engaged and fluid released fan clutch and embodying the invention with the air line to the rotary air union and a fan blade shown in broken lines.
Figure 4:
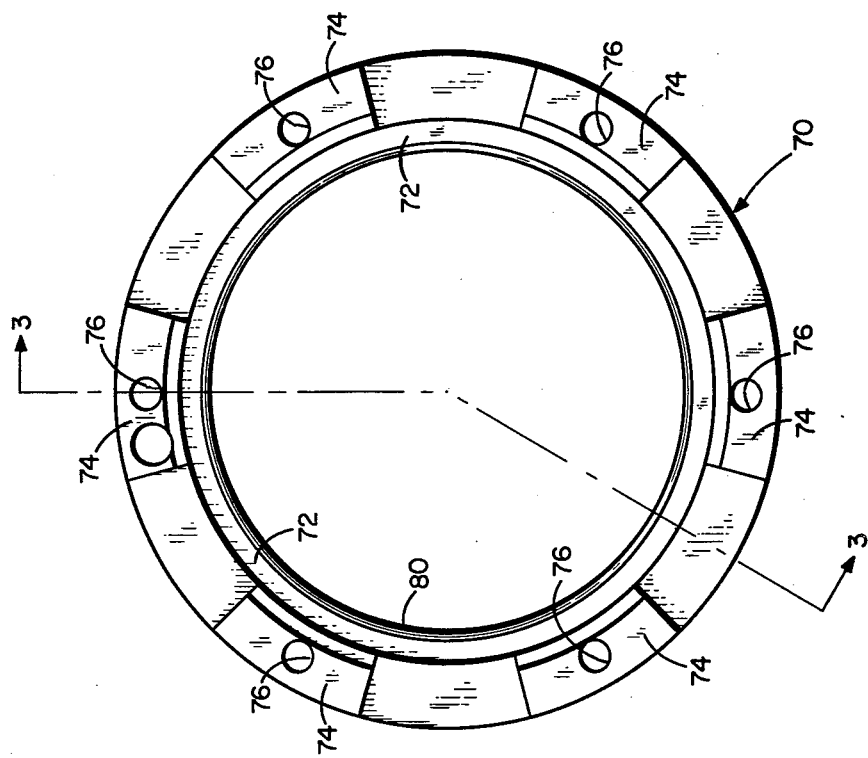
FIG. 4 is an opposite face view of the ring of FIG. 2.
Figure 3:
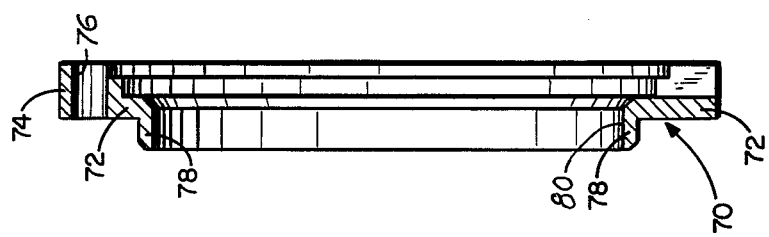
FIG. 3 is a section on the line 3—3 of FIG. 4.
Figure 2:
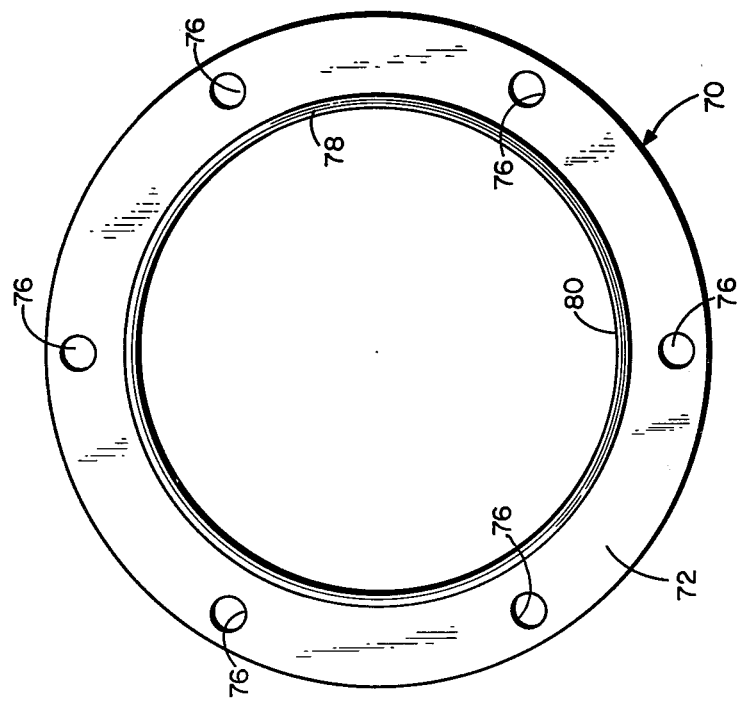
FIG. 2 is a face view of a fan blade mounting ring.
Figure 7:
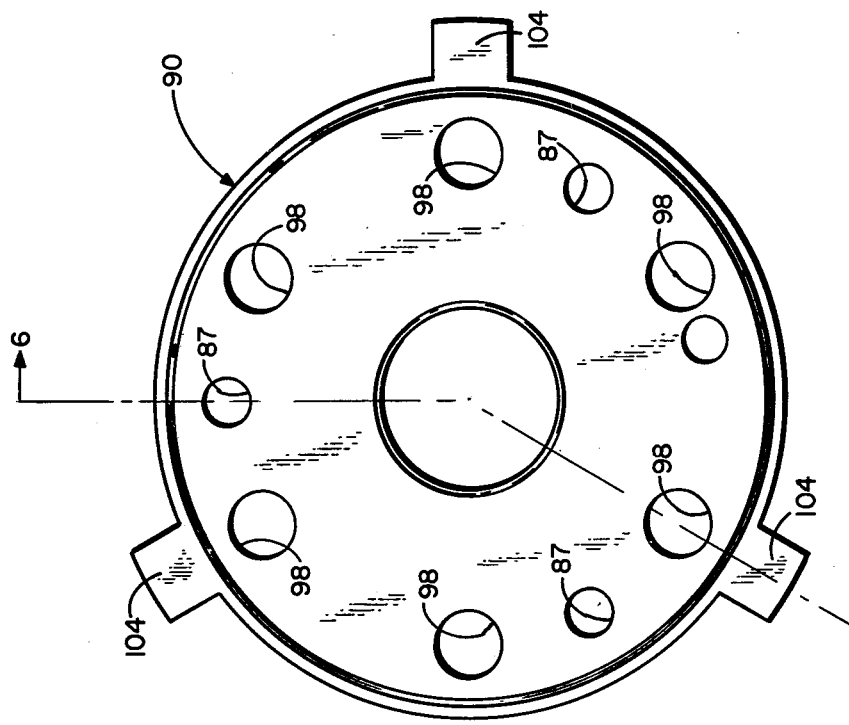
FIG. 7 is a face view opposite to that of FIG. 5.
Figure 6:
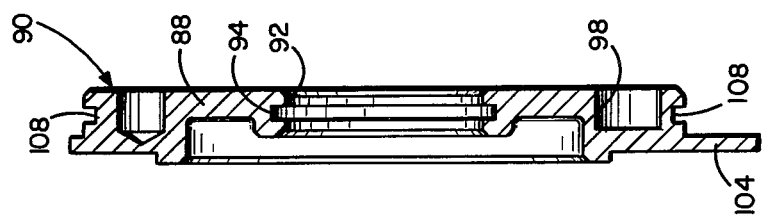
FIG. 6 is a section on the line 6—6 of FIG. 7.
Figure 5:
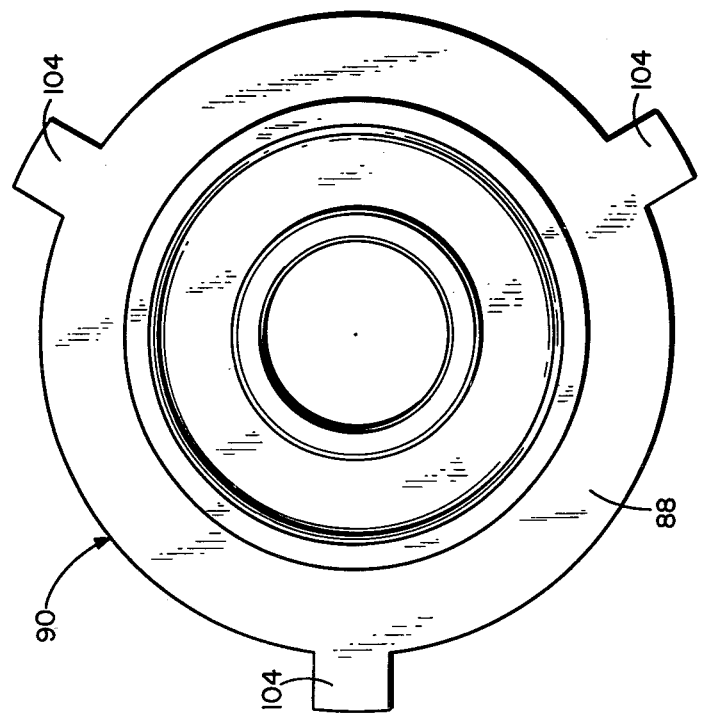
FIG. 5 is a face view of an annular piston.

Referring to the drawings in detail, and with particular reference to FIG. 1, the modular mount unit M for an air-engaged spring released clutch or a spring engaged air released clutch includes the annular mount 10 including the annular flange portion 12 formed with a series of spaced holes 14 for bolting the mount to the flange 16 by means of bolts 18. The flange 16 is formed as part of the shaft 20 connected to a power source such as engine block E as a driving member. The annular flange 12 has formed therein the axial hole 22 and formed on the inner face of the flange 12 is the annular recess 24.

Further provided is the annular friction flange 26 which includes the outer hollow hub portion 28 which has formed on the outer end thereof the axially extending annular rib 30 which fits into the annular recess 24 of the flange 12. The hub portion 28 terminates in the radially extending portion 32 on which the radially disposed annular friction facing surface 34 is formed. The friction flange 26 has extending therethrough the spaced holes 27 which provide optimum cooling for long life inasmuch as the friction flange 26 is live with the power source. An annular shoulder 36 is formed in the hollow hub portion 28 at the inner end thereof against which the outer race 38 of a first bearing 40 is positioned. The outer race 42 of a second bearing 44 is also positioned within the hollow hub portion 28.

The reference numeral 46 designates an inner central hub mounted axially within the hollow outer hub portion 28 of the friction flange 26 by means of the bearings 40 and 44. Adjacent the outer end of the inner hub 46 is the annular recess 48 in which the retainer ring 50 is positioned. The inner race 52 of the second bearing 44 is in abutment with the ring 50 and a spacer ring 54 which is in abutment with the inner race 56 of the first bearing 40 in abutment with the ring 58 in turn in abutment with the shoulder 60 of the enlarged central hub portion 62. The hub portion 62 is formed with the axial cavity 64. The outer end of the hub portion 62 terminates in the radially and outwardly disposed circular wall portion 65. The outer edge of the circular wall portion 65 terminates in the axially extending series of spaced right angular flanges 66, each formed with a threaded bolt hole 68. The voids between the spaced flanges 66 provide ventilation slots and voids into which tabs hereinafter referred to operate.

Further provided is the circular blade mounting ring 70 having the flat annular continuous ring portion 72 from which extends the spaced arcuate coupling projections 74 each having a threaded bolt hole 76. The inner edge of the flat annular ring portion 72 terminates in the annular and axially disposed continuous flange 78 which circumscribes the circular opening 80 of the blade mounting ring 70. The blade mounting ring 70 is secured to the spaced right angular flanges 66 by means of bolts 82 extended through holes 76 of the ring 70 and a fan blade hereinafter referred to and secured in the threaded holes 68 of the spaced right angular flanges 66.

The numeral 84 designates one of a series of spaced torque pins press fit at the outer ends in holes formed in the circular wall portion 65 with the inner end of each of the pins slideably mounted in a bronze bushing 86 press fit in a hole 87 formed in and adjacent the outer periphery of the circular body 88 of the annular piston 90. The piston body 88 is formed with the axial hole 92 and formed in the enlarged edge of the hole 92 is the annular recess 94 in which is positioned the O-ring 96 which has sealing engagement with the outer surface of the hub portion 62.

Figure 11:
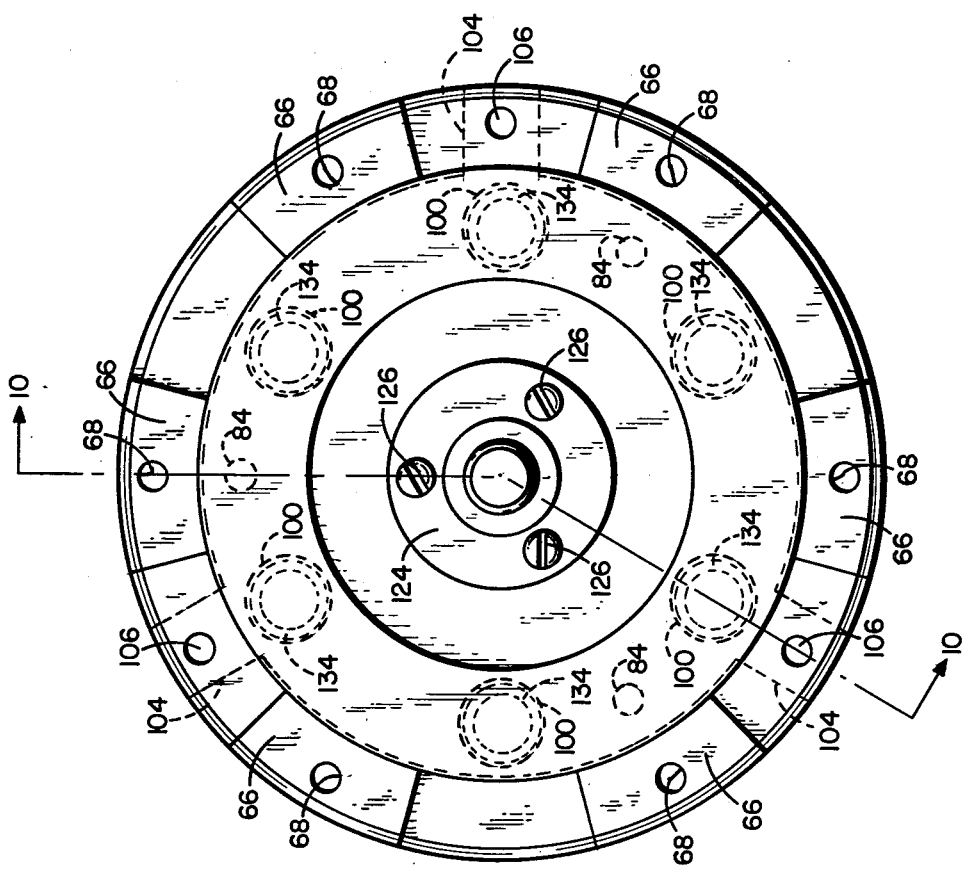
FIG. 11 is a face view of the clutch of FIG. 10.
Figure 9:
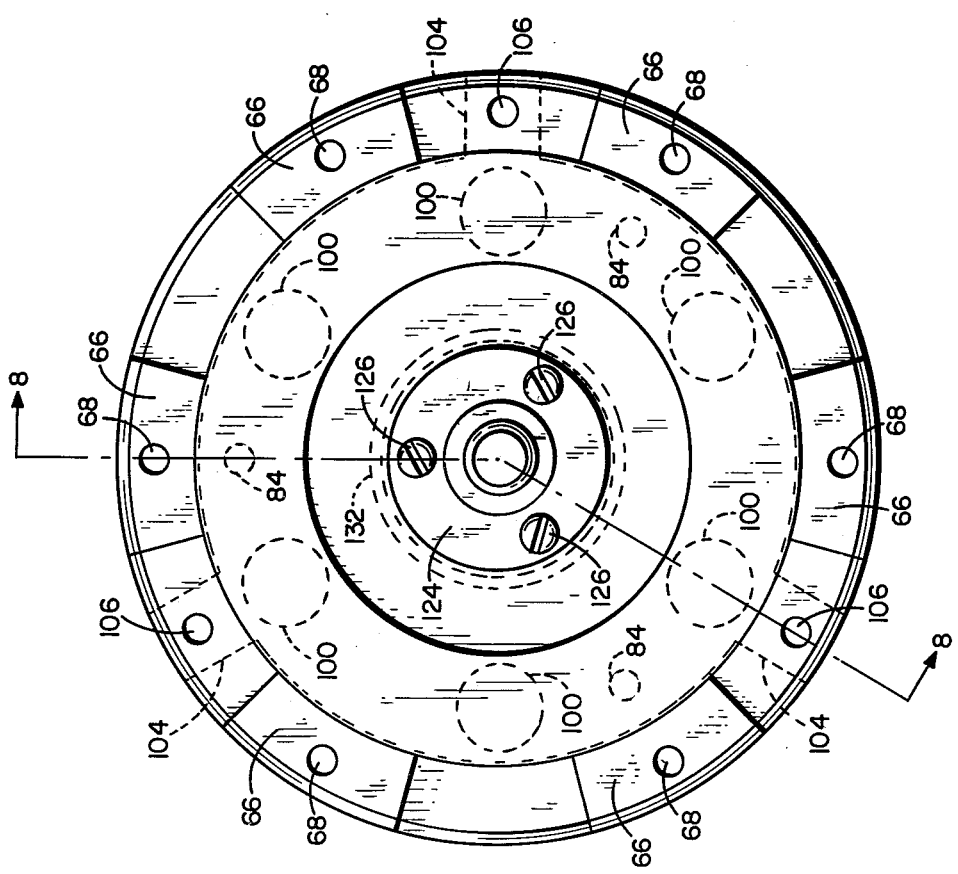
FIG. 9 is a face view of the clutch of FIG. 8.
Figure 10:
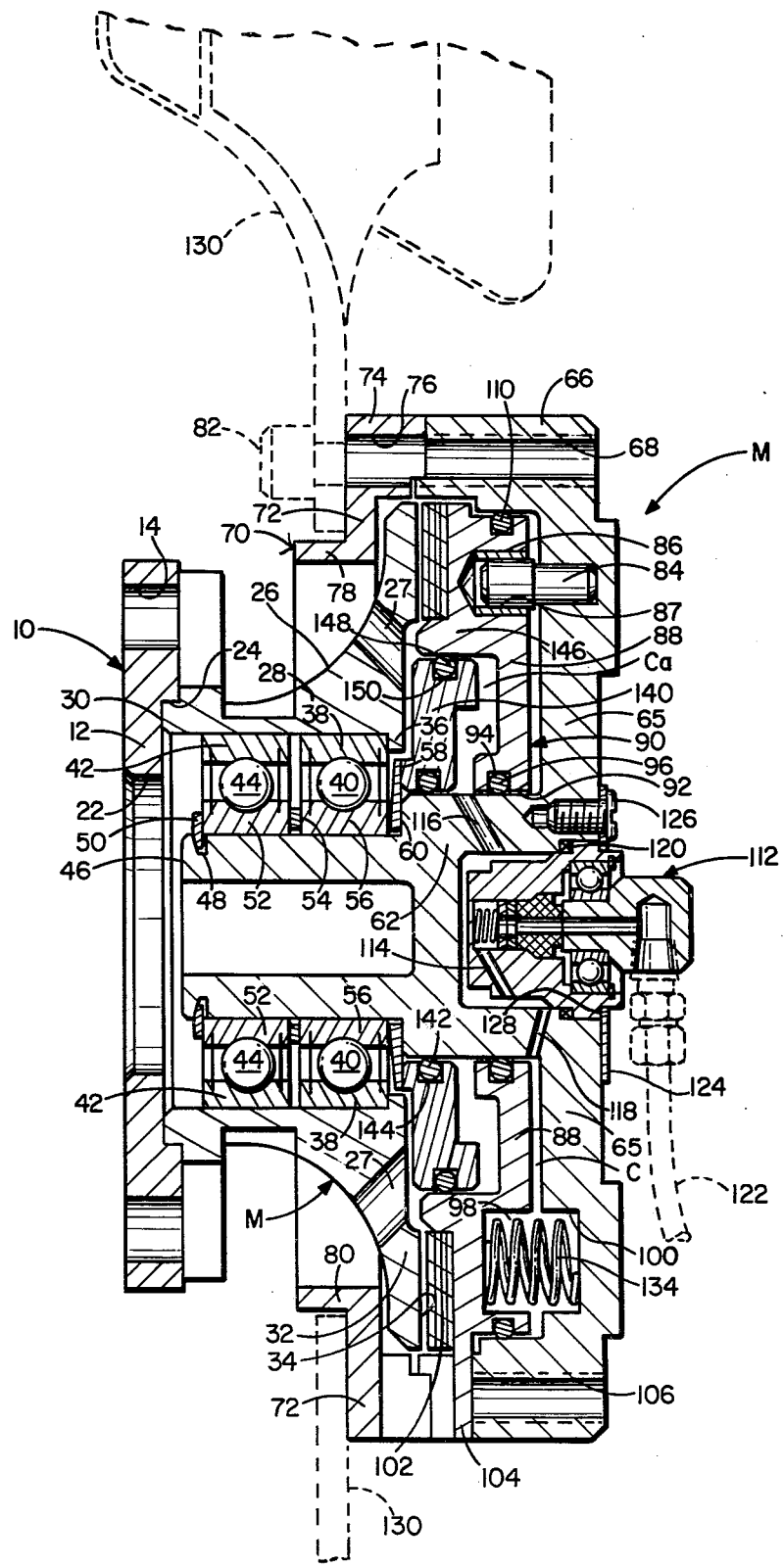
FIG. 10 is a section on the line 10—10 of FIG. 11 of a spring-engaged and fluid released fan clutch.

The circular body portion 88 of the piston is formed with the spaced circular recesses 98 in which will be positioned one end of a coil spring hereinafter referred to for use with a spring-engaged fluid released clutch. The circular wall portion 65 of the hub portion 62 is formed with spaced circular recesses 100 in alignment with recesses 98, to receive other end of a spring positioned in the recesses 100 as illustrated in FIGS. 10 and 11 when a spring engaged clutch is formed. The recesses are not used as in the fluid engaged and spring released clutch of FIGS. 8 and 9. Secured to the piston 90 is the annular friction ring 102 for engagement with the friction flange 26. The outer periphery of the piston has extending radially therefrom the spaced tabs 104 each of which may be contacted and urged by a bolt in a threaded hole 106 formed adjacent the outer periphery of the circular wall portion 65. As the tabs 104 are urged towards the flange 12 by means of bolts in the threaded holes 106, the friction ring 102 may be manually caused to engage the friction facing flange 34 in the event there is a loss of fluid pressure in a fluid engaged spring released clutch.

The outer peripheral edge of the circular body 88 of the piston is formed with the annular recess 108 in which the O-ring 110 is positioned for sealing engagement of the inner surface of the right angular flange 66 to thereby provide a sealed cylinder void C relative to which the piston is operated. Positioned in the cavity 64 of the hub portion 62 is the rotary air union 112 having the air conduit 114 leading to the cavity 64 and leading from the cavity 64 is the air conduit 116. Further provided is the air conduit 118 leading from the axial cavity 64 to the cylinder void C. Sealing engagement of the rotary air union with the axial cavity 64 is made with the O-ring 120, and air pressure is provided to the rotary air union 112 by means of the line 122 connected to a source of air pressure not shown. The air union is held in the axial cavity by means of the ring 124 secured to the circular wall portion 65 by bolts 126 with the ring positioned upon the shoulder 128 of the rotary air union.

The air conduit 116 is not used in the air engaged and spring released fan clutch of FIGS. 8 and 9, but the air conduit 116 is used in the spring engaged fluid released fan clutch of FIGS. 10 and 11 as will be described hereinafter. When the conduit 116 is not used, it is plugged. The air conduit 118 is not used in the spring-engaged fluid released fan clutch of FIGS. 10 and 11 and when not used, it is plugged.

Figure 8:
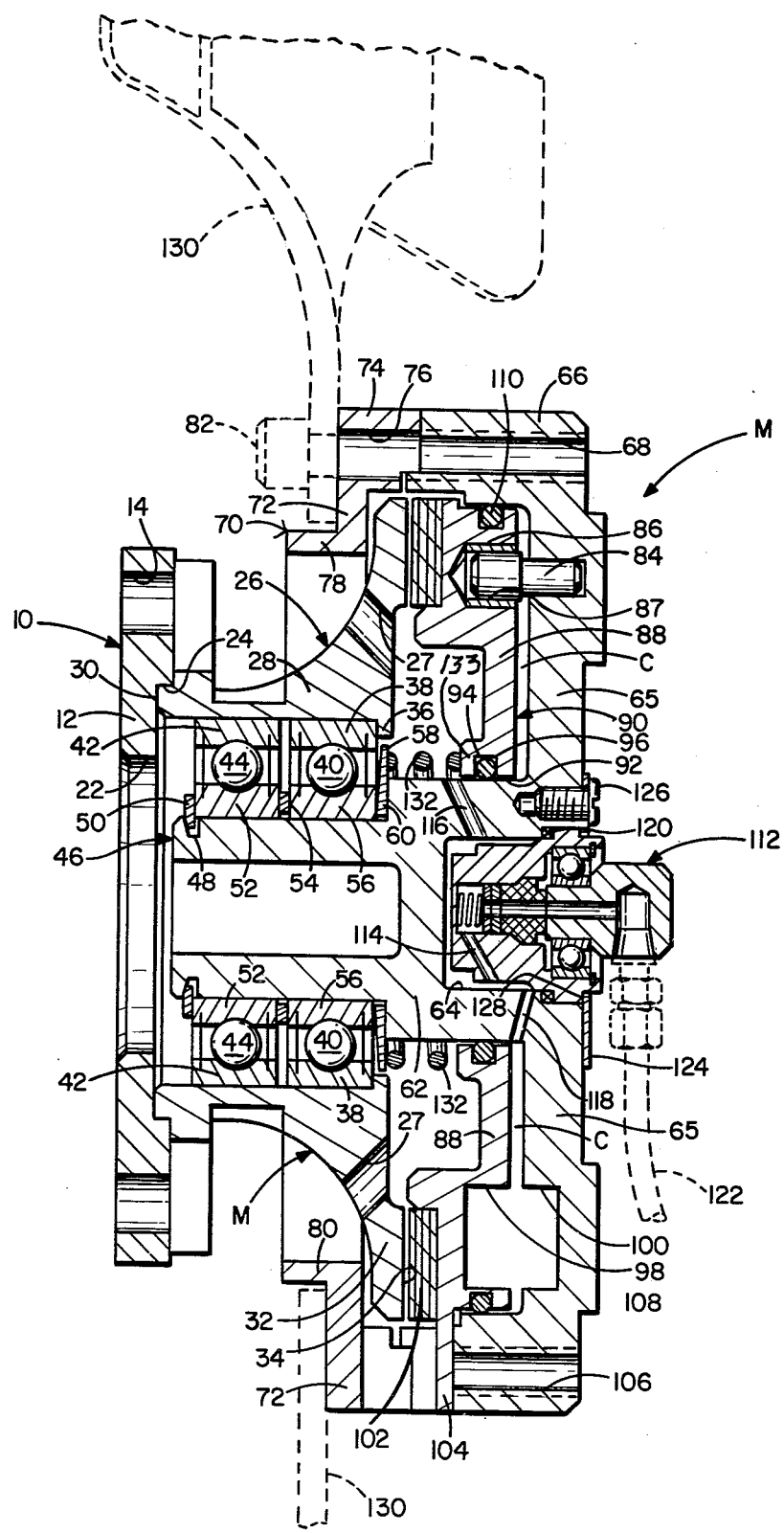
FIG. 8 is a sectional view on the line 8—8 of FIG. 9 of a fluid engaged and spring-released fan clutch.

Relative to each of the FIGS. 1, 8 and 10, of the drawings, a fan blade such as 130 is secured to a threaded hole 76 of the ring 70 by means of a bolt 82 engaging the hole 76 of the blade mounting ring 70. It will be seen that the ring and fan blades thereon may be removed without dismantling any portions of the unit.

In FIGS. 8. and 9., the modular mount unit M is used for an air engaged spring released fan clutch wherein the coil spring 132 is mounted axially upon the enlarged central hub portion 62 and positioned between the ring 58 and the enlarged inner edge 133 of the piston axial hole 92 thereby urging the friction facing 102 of the piston from the friction flange 32. The piston 90 is moved axially so as to engage the friction facing 102 thereof with the friction flange 32 by means of air pressure introduced through air conduits 114 and 118 into the cylinder void C, the air conduit 116 being plugged as non-operative. Relative to the air engaged spring released clutch of FIGS. 8 and 9, let it be assumed that the flange 16 is driven as in FIG. 1 and as a result, the friction flange 32 is thereby driven. If it is desired to clutch in the fan blades 130, air pressure is directed through the rotary air union 112 and out the conduit 114 to and through the air conduit 118 and into the cylinder C whereby the piston is moved against the action of the spring 132. As a result, the friction facing 102 engages the rotating friction flange 32 thereby causing the fan blades to rotate through the right angular flanges 66 and circular wall portion 65 connected to the piston 90 by pins 84. Upon relief of air pressure, the return spring 132 causes the friction facing 102 to disengage from the friction flange 32 thereby stopping the fan blades.

Let it now be assumed that it is desired to construct a spring-engaged fluid released fan clutch using the same modular mount M. With reference to FIGS. 10. and 11., a coil spring 134 is placed in each of the companion recesses 98 and 100 which urge the friction facing 102 into engagement with the friction flange 32 which is live and driven by the flange 16 whereby the fan blades 130 are rotated. An annular mount 140 is positioned on the hub portion 62 with sealing engagement by the O-ring 142 in annular recess 144. The outer edge of the mount 140 is in sealing engagement with the flange 146 of piston 90 by means of O-ring 148 in annular recess 150 thereby forming cylinder void Ca. When it is desired to stop rotation of the fan blades, air pressure is introduced into the rotary air union and out the conduit 114 thence to and out of the conduit 116 (air conduit 118 being plugged) and into the cylinder area Ca whereby the piston 90 is moved thereby disengaging the friction facing 102 from friction flange 32 which is rotating and the fan blades thereby cease to rotate.

The embodiments of the invention to which an exclusive property or privilege is claimed are defined as follows:

1. A modular unit for use with a fluid engaged spring released and a spring engaged fluid released fan clutch comprising, in combination:
   (a) an outer hollow hub which terminates in
   (b) a radially extending annular friction flange,
   (c) means for mounting said outer hub on a live shaft,
   (d) an inner central hub,
   (e) means rotatably mounting an inner portion of said inner central hub within said outer hollow hub,
   (f) said inner central hub terminating in an enlarged central portion which terminates in
   (g) a radially disposed circular wall portion which terminates in a series of spaced right angular flanges, (h) an annular piston having a first axial side and a second axial side, (i) means mounting said annular piston on said enlarged central portion of said inner central hub, (j) means securing a series of fan blades on said radially disposed circular wall, (k) a friction facing ring carried by said piston, (l) a source of fluid pressure, (m) a first fluid passageway for fluid communication from the source of fluid pressure and the first axial side of said piston, (n) a second fluid passageway for fluid communication from the source of fluid pressure and the second axial side of the piston, (o) means for forming a cylinder void for moving the piston in a first axial direction on said inner central hub, (p) spring means carried by said unit for urging said piston axially on said inner central hub in the opposite axial direction, and (q) means for plugging the first fluid passageway when the cylinder void is located on the second axial side of the piston or for plugging the second fluid passageway when the cylinder void is located on the first axial side of the piston wherein when the first fluid passageway is plugged the modular unit operates as a fluid engaged spring released clutch and when the second fluid passageway is plugged the modular unit operates as a spring engaged fluid released clutch.

2. The device of claim 1 in which said means for mounting said outer hub on a live shaft includes (a) an annular flange carried by said hub.

3. The device of claim 2 in which said means rotatably mounting said outer hollow hub on an inner portion of said inner central hub includes a pair of bearings interposed therebetween with one of said bearings substantially in radial alignment with said annular friction flange.

4. The device of claim 1 in which said means rotatably mounting said outer hollow hub on an inner portion of said inner central hub includes a pair of bearings interposed therebetween.

5. The device of claim 3 in which said means mounting said annular piston on said central portion of said inner central hub includes a series of spaced torque pins secured at one end portion thereof in said circular wall portion with the other end portion slideably mounted in said annular piston.

6. The device of claim 1 in which said means mounting said annular piston on said central portion of said inner central hub includes a series of spaced torque pins secured at one end portion thereof in said circular wall portion with the other end portion slideably mounted in said annular piston.

7. The device of claim 2 in which said means mounting said annular piston on said central portion of said inner central hub includes a series of spaced torque pins secured at one end portion thereof in said circular wall portion with the other end portion slideably mounted in said annular piston.

8. The device of claim 1 in which said means securing a series of fan blades on said radially disposed circular wall includes (a) a ring having a series of fan blades extending therefrom, and (b) means for securing said ring to said right angular flanges of said circular wall portion.

9. The device of claim 1 in which said spring means is a coil spring mounted axially on said enlarged central portion of said inner hub between said piston and said means rotatably mounting said outer hollow hub for urging said piston and friction facing ring thereon from said annular friction flange for disengagement of the clutch in a fluid engaged spring released clutch.

10. The device of claim 1 in which said spring means includes a series of spaced coil springs carried by and between said piston and said radially disposed circular wall portion for urging said piston and said friction facing ring thereon into engagement with said annular friction flange for engagement of the clutch in a spring engaged fluid released clutch.

11. Modular unit for use as a clutch, with the clutch being one of a fluid engaged spring released clutch and a spring engaged fluid released clutch, comprising, in combination: a friction disc; a piston having a first axial side and a second axial side; means operatively connected to the piston for frictionally engaging with the friction disc; means for rotatably and reciprocally mounting the piston with respect to the friction disc, with the piston being slideable between a position where the engaging means engages with the friction disc and a position where the engaging means does not engage the friction disc; a source of pressurized fluid; a first fluid passageway for fluid communication from the source of pressurized fluid and the first axial side of the piston; a second fluid passageway for fluid communication from the source of pressurized fluid and the second axial side of the piston; means for forming a cylinder void for moving the piston in a first axial direction; spring means for moving the piston in the opposite axial direction; and means for plugging the first fluid passageway when the cylinder void is located on the second axial side of the piston or for plugging the second fluid passageway when the cylinder void is located on the first axial side of the piston wherein when the first fluid passageway is plugged the modular unit operates as a fluid engaged spring released clutch and when the second fluid passageway is plugged the modular unit operates as a spring engaged fluid released clutch.

12. The modular unit of claim 11 further comprising, in combination: a circular wall portion located on the opposite axial side of the piston from the friction disc; with the piston being rotatably related to but reciprocal with respect to the circular wall portion; and wherein when the first fluid passageway is plugged, the cylinder void is defined by and between the piston and the circular wall portion.

13. The modular unit of claim 11 further comprising, in combination: a mount located between the piston and the friction disc; with the piston being rotatably related to but reciprocal with respect to the mount; and wherein when the second fluid passageway is plugged, the cylinder void is defined by and between the piston and the mount.

14. The modular unit of claim 11 wherein the source of pressurized fluid comprises, in combination: a hub portion having an outside surface and an internal cavity, with the piston including an axial hole for the reciprocal receipt on the outside surface of the hub portion; a rotary union located within the cavity of the hub portion for providing fluid pressure into the cavity of the hub, with the first and second fluid passageways being formed in the hub portion and extending from the cavity to the outside surface of the hub portion.

15. The modular unit of claim 14 wherein the piston rotatably and reciprocally mounting means comprises, in combination: a hollow hub operatively attached to the friction disc; with the hollow hub being operatively attached to a source of power; a central hub operatively attached to the hub portion along a clutch axis; and means for rotatably mounting the central hub within the hollow hub for sole support thereby.

16. The modular unit of claim 15 wherein the central hub rotatably mounting means comprises, in combination: bearings having a first race within the hollow hub and having a second race located on the central hub; and wherein the diameter of the hub portion is greater than the diameter of the central hub such that the central hub acts as an abutment for the second race of the bearings.

17. The modular unit of claim 15 further comprising, in combination: an annular amount located between the piston and the friction disc, with the mount being mounted on the hub portion; and wherein when the second fluid passageway is plugged, the cylinder void is defined by and between the piston and the annular mount.

18. The modular unit of claim 15 further comprising, in combination: a circular wall portion located on the opposite axial side of the piston from the friction disc, with the circular wall portion being operatively attached to the hub portion; and wherein when the first fluid passageway is plugged, the cylinder void is defined by and between the piston and the circular wall portion.

19. The modular unit of claim 18 further comprising, in combination: an annular mount located between the piston and the friction disc, with the mount being mounted on the hub portion; and wherein when the second fluid passageway is plugged, the cylinder void is defined by and between the piston and the annular mount.

* * * * *